J. R. GRIFFIN.
HAME FASTENER.
APPLICATION FILED NOV. 18, 1913.

1,133,856.

Patented Mar. 30, 1915.

Witnesses
J. W. Stitt,
W. P. Tinsley.

Inventor,
John R. Griffin,
By A. D. Jackson,
Attorney

UNITED STATES PATENT OFFICE.

JOHN R. GRIFFIN, OF ITASCA, TEXAS.

HAME-FASTENER.

1,133,856.

Specification of Letters Patent.

Patented Mar. 30, 1915.

Application filed November 18, 1913. Serial No. 801,599.

*To all whom it may concern:*

Be it known that I, JOHN R. GRIFFIN, a citizen of the United States, residing at Itasca, in the county of Hill and State of Texas, have invented certain new and useful Improvements in Hame-Fasteners, of which the following is a specification.

My invention relates to hame fasteners and more particularly to hame fasteners for the lower ends or breast portions of the hames, and the object is to provide a hame fastener which is provided with two detachable hook members which are adjustable relative to each other so that they can be adapted for use on hames which have the lower ends more or less close to each other and which are provided with spring actuated keepers by which the hames are held in any position they may assume when placed on a collar.

Another object is to provide the fasteners with convenient hooks or beaks for operating the adjustable members.

Other objects and advantages will be fully explained in the following description and the invention will be more particularly pointed out in the claims.

Reference is had to the accompanying drawings which form a part of this application.

Figure 1:
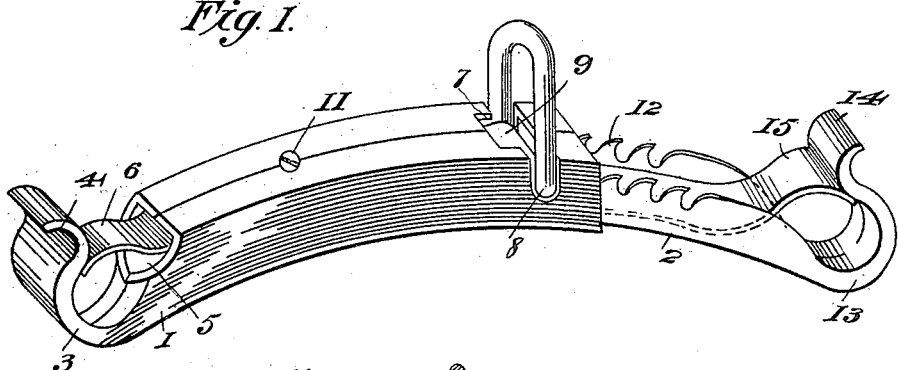
Figure 2:
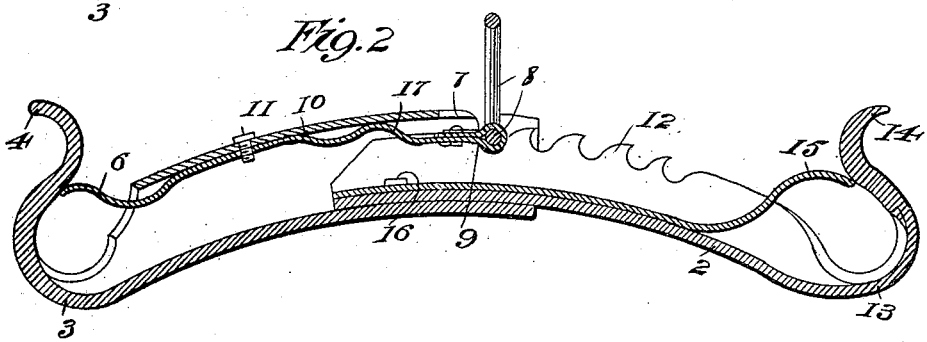
Figure 3:
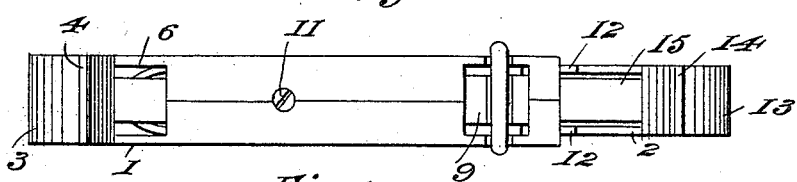
Figure 4:
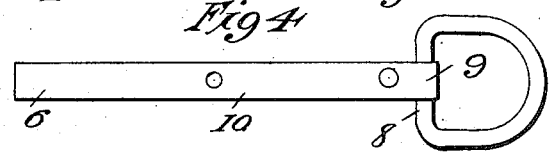

Figure 1 is a perspective view of the hame fastener assembled as when in use. Fig. 2 is a longitudinal section of the fastener. Fig. 3 is a front view of the same. Fig. 4 is a plan view of the combined spring detent and keeper.

Similar characters of reference are used to indicate the same parts throughout the several views.

The fastener is made up of two correlated members 1 and 2, the latter having one end telescoping in the former. These members may be of sheet metal. The member 1 is formed into a box sleeve substantially square in cross-section and terminates with a hook 3 and has a handle 4 formed at the termination of the hook 3 and has an opening 5 for the movement of the keeper 6 and an opening 7 for the operation of the detent 8 and the end 9 of the spring which carries the detent 8, the spring 10 having a keeper 6 on one end and a loop 9 on the other end for carrying the detent 8. The spring 10 is attached to the front part of the member 1 by a screw 11. The member 2 consists of a body channel shaped and has racks 12 formed in the edges thereof. The teeth of the rack are hooked shaped to be engaged by the detent 8. The member 2 telescopes into member 1, as shown, and is held in the member 1 by the detent 8 which is carried by the spring 10 which holds the detent down in between the teeth 12. The detent 8 consists of a ring having one straight portion to be engaged by the spring 10 and by the racks 12. The member 2 with the racks 12 can be forced into the member 3, but it is apparent that when the member 2 is engaged by the detent 8, it cannot be withdrawn until the detent is drawn out of the racks 12. The opening 7 is provided so that the detent can be drawn far enough out of the member 1 to release the racks 12. The member 2 terminates with a hook 13 and has a handle 14 formed at the termination of the hook 13 and a keeper 15 is provided to bear against the beak or handle 14. The hame loops are caught in the hooks 3 and 13, the keepers 6 and 15 yielding to allow the loops to pass in the hooks. The keeper 15 is made of spring metal and is attached to the interior of the member 2 by a rivet 16. The spring 10 lies between the racks 12 so that the racks can engage the detent 8 on each side of the loop 9.

In use the member 2 may be partly withdrawn from the member 1 by releasing the detent 8 from the racks 12. The hame loops can be pressed into the hooks 3 and 13. The member 2 can then be forced back into the member 1 by taking hold of the handles 4 and 14 and pressing them toward each other. The detent 8 may be placed between any pairs of teeth of the racks 12 that the adjustment of the hames may require. When the hames are to be released, the detent 8 may be withdrawn from the racks 12 so that the member 2 may be withdrawn or partly withdrawn from the member 1. The member 2 may be wholly withdrawn from the member 1 and the member 2 be carried by one hame loop and the member 1 carried by the other hame loop or the member 2 may be partly withdrawn from the member 1 and one hame loop released from one of the hooks 3 or 13. The hame loop may be released from the hook 13 by pressing down the keeper 15.

The detent 8 is held in the racks by the spring 10 which has a bend 17 which bears against the upper interior of the member 1. When the members 1 and 2 are to be detached or adjusted, the detent must be drawn enough to overcome the tension of the spring 10.

What I claim, is,—

1. A hame fastener comprising two correlated members, one of which has a body portion formed into a sleeve and terminating at one end with a hook, the other correlated member having a channel shaped body portion telescoping in said sleeve and having a hook on the outer end and rack teeth formed on the longitudinal edges of the body thereof, a spring keeper attached in the bed of said channel shaped member and guarding the hook of said member, a detent for engaging said rack teeth projecting through the side of said sleeve member, and a spring member attached to the interior of said sleeve and carrying at the outer end a keeper for the hook of said sleeve member and carrying said detent at the other end, said spring having a bend bearing against the interior of said sleeve for holding said detent down between pairs of said rack teeth.

2. A hame fastener comprising two correlated members, one of which has a body portion formed into a sleeve and having a hook on the outer end terminating with a handle, the other correlated member having a body portion formed into a channel shape telescoping in said sleeve and having a hook on the outer end terminating with a handle and having hooked teeth formed on the edges of the channel shaped portion, a spring keeper attached in the bed of said channel shaped member and guarding the hook of said member, said sleeve member having a slot in the side thereof near its inner end, a detent projected through said slot and engaging said teeth, and a spring member attached to the interior of said sleeve and carrying said detent at one end and having the other end formed into a keeper for the hook of said sleeve member and having a bend between its point of attachment to said sleeve and said detent bearing against said sleeve whereby said detent is held down between pairs of said teeth.

In testimony whereof, I set my hand in the presence of two witnesses, this 14th day of November, 1913.

JOHN R. GRIFFIN.

Witnesses:
A. L. JACKSON,
J. W. STITT.

Copies of this patent may be obtained for five cents each, by addressing the "Commissioner of Patents, Washington, D. C."